UNITED STATES PATENT OFFICE.

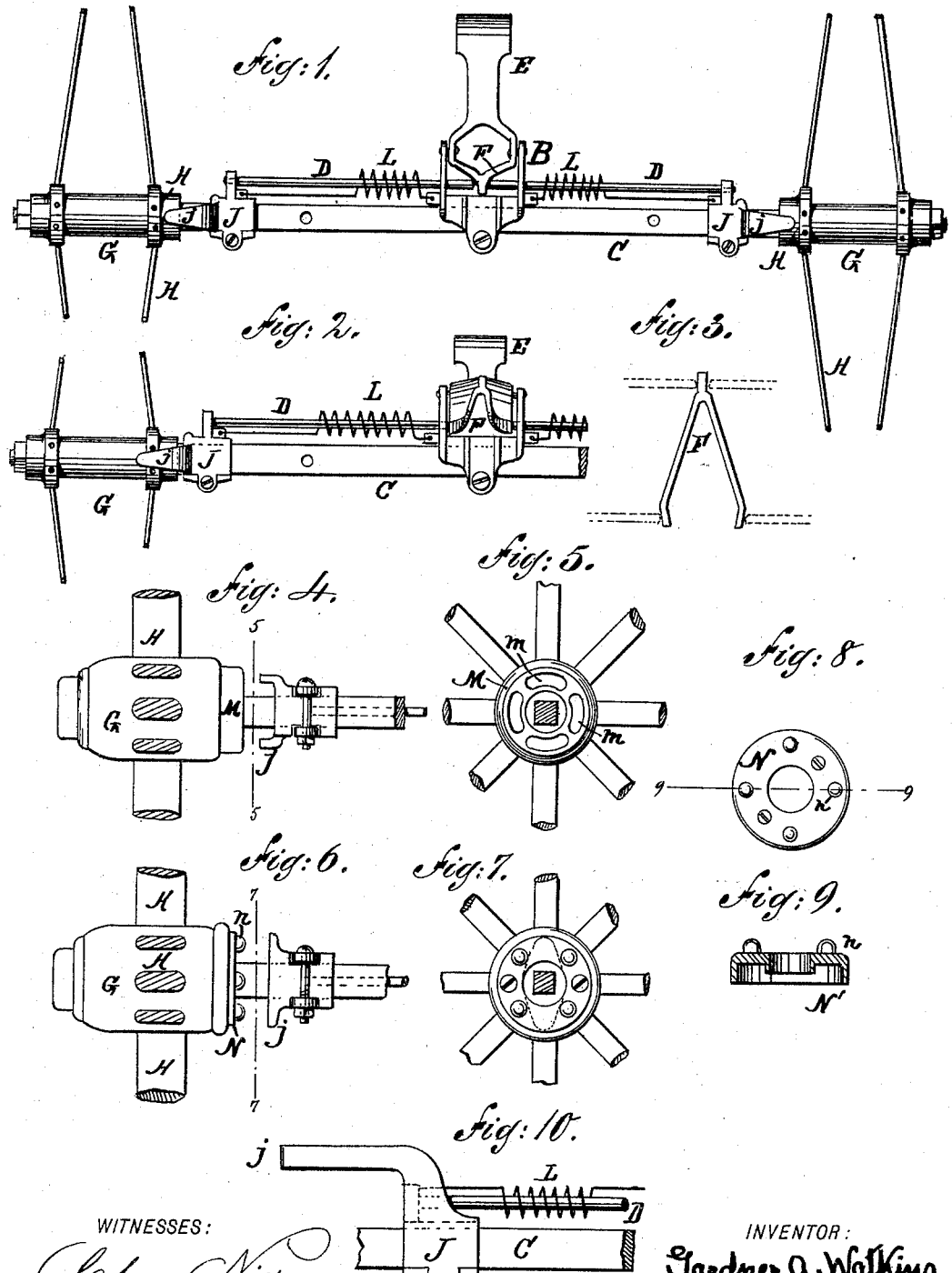

GARDNER A. WATKINS, OF GARDNER, MASSACHUSETTS, ASSIGNOR TO HEYWOOD BROS. & CO., OF SAME PLACE.

LOCK FOR BABY-CARRIAGES.

SPECIFICATION forming part of Letters Patent No. 482,708, dated September 13, 1892.

Application filed April 26, 1892. Serial No. 430,477. (No model.)

*To all whom it may concern:*

Be it known that I, GARDNER A. WATKINS, of Gardner, in the county of Worcester and State of Massachusetts, have invented certain new and useful Improvements in Locks for Baby-Carriages and Like Uses, of which the following is a description, reference being had to the accompanying drawings, which form part of this specification.

My invention relates particularly to locks or clamps arranged to engage with and lock the wheels of baby-carriages.

It consists of and is embodied in the lock or clamp and the pedal-movement by which it is operated, with the novel features constructed, arranged, combined, and operated substantially in the manner and for the purposes hereinafter described, illustrated, and claimed.

In the drawings, Figure 1 is a plan view of my invention as applied to the rear axle of the baby-carriage provided with iron wheels and wire spokes. Fig. 2 is a view of the same, showing the parts in position when the wheels are not free to turn. Fig. 3 shows an unwinding or development, onto the plane of the paper, of the cam-motion by which the locks are operated. Figs. 4 and 5 show a modification of my invention. Figs. 6 and 7 show a further modification. Figs. 8 and 9 are respectively an elevation and a cross-section of a modified form of cap for the hub of the wheel that can be used for the construction shown in Figs. 6 and 7, and Fig. 10 is a detail of the clamp or lock of the type shown in Figs. 1 and 2 as arranged for wooden wheels I.

In the figures like letters of reference indicate like parts.

By my invention I operate my locks or clamps from the center of the rear axle. Projecting arms or dogs carried upon boxes which slide upon the axle are arranged to engage either the spokes or some special attachment upon the wheel. Sliding rods are secured to these boxes and extend toward the center of the axle. At the center I provide a pedal-movement and cam-motion arranged to drive the rods outward or apart against the action of a spring which tends to draw them together. By depressing the pedal the cam is forced between the inner ends of the rod and the dogs are thrown out into engagement with the wheels. When the pedal is released, the springs force it back and withdraw the dogs, leaving the wheels to rotate. The cam is arranged with depressions at one end of its travel in well-known manner, so that when the cam is forced between the rods the tips of the rods spring into such depressions and retain the cam in position. To release the cam, it is only necessary to throw the pedal far enough to bring the tips of the rods out of these depressions, when the springs will cause the pedal to fly up. Such is the general nature of my invention. In the drawings I have shown several forms of it.

Fig. 1 is a plan view of one complete form of my invention, showing its position when the pedal E is up and the dogs *j* do not engage the wheels. In this figure the dogs are shown arranged for use with metal hubs G and wire spokes H.

In Fig. 2 the same device is shown in position for locking the wheels. The cam-motion is carried upon the bracket B, secured to the center of the axle C. The inner ends of the rods D project through and have bearing in the sides of the brackets B, as shown. The pedal E and cam F are pivoted in the bracket B and turn on a horizontal axis. This rotary motion is limited by suitable stops to about ninety degrees, so that the pedal moves from somewhat above a horizontal position into a downwardly-projecting vertical position. These two positions are respectively shown in Figs. 1 and 2. The cam-faces form divergent spirals and are so placed that depressing the pedal forces them in between the tips of the rods and drives the rods apart.

In Fig. 3 the cam-faces are shown as unwound or developed into the plane of the paper. The positions of the tips of the rods D for the horizontal and the depressed position of the pedal are indicated, respectively, in dotted and in full lines. From this figure it is seen that the divergent spirals at their outer ends converge slightly, permitting the tips of the rods to again approach each other. This retains the dogs, cam, and other parts in position for engaging the wheels. When, however, the pedal has been tripped by the foot of the person operating it, the tips of the rods pass out of the convergent portions of the spirals and press together against the cam and throwing the cam around and bringing the pedal to its horizontal position. This allows the springs to withdraw the dogs from engagement with the wheels. I prefer to cast the cam in one piece with the pedal, though of course this is not essential to my invention. At G is shown the hub of the wheel, and at H the spokes, which in Figs. 1 and 2 are of metal. At J are shown the sliding heads or boxes, which carry the dog or arms $j$, of size and shape adapted to run in between the spokes of the wheels near the hub and lock the wheel. As shown, these sliding boxes are placed near the end of the axle just inside the wheel. The location may be varied in special cases where other parts interfere. Preferably these boxes J surround and slide upon the axle. The rods D are secured at their outer ends to the boxes and serve to actuate them. Springs L draw in the boxes toward the bracket B and withdraw the dogs from the wheels. Preferably these springs encircle the rods D and are secured at one end to the sliding boxes and at their other to the bracket B. When the pedal is depressed and the rods forced outward, the springs are extended, and when the pedal is released the spring draws the sliding boxes toward the bracket, forcing the tips of the rods against the cam and causing the pedal to fly up. The springs L should be in tension even when the dogs are withdrawn, as by this means the rods are pressed firmly against the cam and the parts prevented from rattling. It may be noticed that the dogs engage the spokes close to the hub and in this way do not tend to bend the spokes or to otherwise injure the wheel.

Fig. 4 shows a modification of the dogs and of the way in which they engage and lock the wheels. In this figure a cap upon the hub of the wheel is used.

A detail of the cap is shown in Fig. 5. The dogs are made somewhat shorter than in the form previously described, and instead of engaging the spokes of the wheel they run in the recesses $m$ in the cap M. The principles involved are exactly the same as in the form above described; but the wear, instead of coming upon the hub of the wheel, comes upon the metal cap M. This form is especially adapted for wooden wheels, though it may be used with others.

A further modification of my invention is shown in Figs. 6 and 7. In this instance the dogs pass between projecting studs $n$, secured to the hub of the wheel. Preferably these studs $n$ are cast upon a plate N, and in this manner secured to the hub of the wheel. The dogs may be mere radial projections from the sliding boxes J.

Figs. 7 and 8 show a slight variation from the last form, the studs being secured from a cap-piece or collar N'. This variation gives a more finished appearance to the hub of the wheel.

With wooden hubs and wooden spokes I prefer one of the constructions shown in Figs. 4 to 8, inclusive. I may, however, use the form indicated in Figs. 1 and 2, in which the projecting arm or dog is made somewhat larger to pass around the wooden hub and engage the spoke at a somewhat greater distance from the axis of rotation, as the wear is reduced by increasing the distance.

I have now set forth several forms of my invention and the way in which it operates.

I therefore, without limiting myself to the details shown, and desiring to secure by these Letters Patent the many immaterial modifications which may be made or which may suggest themselves to the skilled mechanic, claim as my own, and desire to secure by these Letters Patent, the following:

1. In combination with a wheel and axle, a sliding box provided with one or more projecting arms or dogs constructed to engage said wheel, a pedal, a cam, and an operating-rod secured to the said sliding box and co-operating with the said cam, substantially as and for the purposes set forth.

2. In combination with the wheels and axle of a baby-carriage or other vehicle, a pair of sliding boxes carried upon the said axle and each provided with one or more projecting arms or dogs constructed to engage one of the said wheels, a pedal, a cam, and one or more operating-rods co-operating with the said cam and arranged to simultaneously throw the said dogs into or out of engagement with the said wheels, substantially as and for the purposes set forth.

3. A lock for the wheels of baby-carriages, consisting of a sliding clamp and a plate turning with one of the said wheels and provided with recesses or projections to engage the said clamp, substantially as set forth.

4. A lock for the wheels of baby-carriages, consisting of a sliding clamp and studs secured to one of the said wheels and constructed to engage the said clamp, substantially as and for the purposes set forth.

5. In combination with a wheel and axle, one or more dogs constructed to engage the said wheel, a pedal-movement secured at or near the center of the said axle, and one or more rods co-operating with the said pedal-movement to throw the said dogs into or out of engagement with the said wheel, substantially as and for the purposes set forth.

In testimony whereof I have hereunto set my hand this 19th day of April, 1892.

GARDNER A. WATKINS.

Witnesses:
   G. M. PLYMPTON,
   HAROLD BURNEY.